United States Patent
Berning et al.

[15] 3,698,682
[45] Oct. 17, 1972

[54] SOLENOID ACTUATED VALVE FOR ANHYDROUS AMMONIA FLOW METERS

[72] Inventors: Eugene B. Berning, Marienthal, Kans. 67863; John E. Holmes, P.O. Box 1111, Garden City, Kans. 67846

[22] Filed: Jan. 25, 1971

[21] Appl. No.: 109,328

[52] U.S. Cl...................................251/30, 251/44
[51] Int. Cl............................................F16k 31/383
[58] Field of Search...............................251/44, 30

[56] References Cited

UNITED STATES PATENTS

| | | | |
|---|---|---|---|
| 2,479,359 | 8/1949 | Holt | 251/30 X |
| 3,250,294 | 5/1966 | Hipple | 251/30 X |

FOREIGN PATENTS OR APPLICATIONS

| | | | |
|---|---|---|---|
| 1,280,661 | 11/1961 | France | 251/30 |

Primary Examiner—Arnold Rosenthal
Attorney—John H. Widdowson

[57] ABSTRACT

A solenoid actuated valve operator is used for controlling the flow of a normally gaseous fluid in a conduit having an internal valve seat. A housing is mountable with the conduit. A solenoid mounts with the housing. A plunger extends from the housing, which receives fluid pressure. A passageway through the plunger communicates with the solenoid and a valve closer on the extended end thereof. The core of the solenoid operates to open and close the passageway. Another passageway connects the solenoid assembly and the outside of the housing. The plunger is urged to extended position by a resiliently applied force. The solenoid actuated valve operator when mounted contacts with the valve closer the conduit valve seat. With the core member disengaged liquid fluid pressure exerts a force on the plunger overcoming the resilient force to retract the plunger and open the conduit.

7 Claims, 3 Drawing Figures

PATENTED OCT 17 1972

3,698,682

INVENTORS
JOHN E. HOLMES
EUGENE B. BERNING
BY
John H. Widdowson
ATTORNEY

SOLENOID ACTUATED VALVE FOR ANHYDROUS AMMONIA FLOW METERS

Numerous types of solenoid valves and solenoid operated valves are known in the art; however, these valves are not easily adapted to use in handling gaseous fluids. In particular there are solenoid operated valves which are not readily adapted or adaptable for use with conventional anhydrous ammonia flow meters. An anhydrous ammonia flow meter is a device which regulates the amount of gaseous fluid flowing from a reservoir. Anhydrous ammonia is a fluid stored as a liquid when under pressure in a sealed reservoir and flashes to a gaseous fluid at a reduced pressure when it is injected into the ground as a fertilizer. The prior art solenoid valves are constructed and designed to be used and mounted with a fluid conduit or pipe or to be mounted directly adjoining some device. Conventional anhydrous ammonia flow meters utilize a main valve having the valve seat portion contained in the flow meter and the valve sealing member extending into the flow meter actuated by a mechanical contrivance external to the flow meter which is remotely operable by means of a lanyard or the like where the flow meter is used on agricultural fertilizing equipment. These conventional anhydrous ammonia flow meters because of their structure and internal main valve arrangement are not particularly suited for use of the prior art solenoid valves. The conventional mechanically actuated anhydrous ammonia flow meter main valve operators have the disadvantage of not providing a positive means of shutting off the flow of anhydrous ammonia should the control lanyard fail. The mechanical valves are designed and constructed to be set in the open position and closed by pulling on the lanyard.

When anhydrous ammonia is being dispensed for agricultural use as a fertilizer, it is carried in a large tank connected to an ammonia drill device which is pulled by a tractor. The tractor operator actuates the valve operator on the anhydrous ammonia flow meter and pulls the ammonia drill device with the tractor. Should for some reason the apparatus need attention or service while the anhydrous ammonia is flowing and the valve operator not positively shut off the flow, a dangerous condition will be created by the escaping anhydrous ammonia gas. Unless a person has the proper breathing equipment, it would be very dangerous to approach an operating anhydrous ammonia drill device to service it; and often, unless it can be serviced properly, the gas will continue to escape to the atmosphere and be lost. Thus, a positive shut off main valve operator is desirable for use with anhydrous ammonia flow meters.

In one preferred specific embodiment of this invention, a solenoid actuated valve operator for use with anhydrous ammonia flow meters is provided which includes a resiliently urged movable piston-plunger with a valve closing member assembly normally engaged with the main valve seat of the flow meter and having a remotely operable solenoid assembly. The solenoid actuated valve operator includes a housing containing the piston portion of the movable piston-plunger assembly and with the solenoid assembly on the top thereof. It also has an extended plunger with the valve closing member on the end thereof extending from the housing adapted to engage the control valve seat inside the flow meter. The housing is mounted with the anhydrous ammonia flow meter so the valve closing member is contactable with the main valve seat inside the flow meter in a normally closed position. A system of apertures and passageways connect the exterior of the extended plunger with the solenoid assembly; the core of the electrically operated solenoid assembly is positioned in the system of passageways to function as a valve controlling flow therethrough. The system of apertures and passageways permits flow of the gaseous fluid through the housing so as to move the movable piston-plunger assembly opening the valve. The movable piston-plunger assembly is resiliently urged to an extended position holding the valve closing member in a normally closed position to provide for positive stoppage of flow through the flow meter.

One object of this invention is to provide a solenoid actuated valve operator for use in handling normally gaseous fluids overcoming the aforementioned disadvantages of the prior art devices.

Still, one other object of this invention is to provide a solenoid actuated valve operator for use in handling normally gaseous fluids which is usable with conventionally designed anhydrous ammonia flow meters and which is remotely electrically operable to provide positive flow control.

Still another object of this invention is to provide a solenoid actuated valve operator which is held in a normally closed position by a resilient force and openable by utilizing operating pressure from the normally gaseous fluid it is controlling.

Yet an additional object of this invention is to provide a solenoid actuated valve operator which has a housing containing a resiliently urged movable piston-plunger assembly and a system of apertures and passageways permitting flow through the piston-plunger assembly controllable by a solenoid assembly with the flow through the piston-plunger assembly functioning to open the valve.

Various other objects, advantages, and features of the invention will become apparent to those skilled in the art from the following discussion, taken in conjunction with the accompanying drawings, in which.

Figures 1, 2, 3:
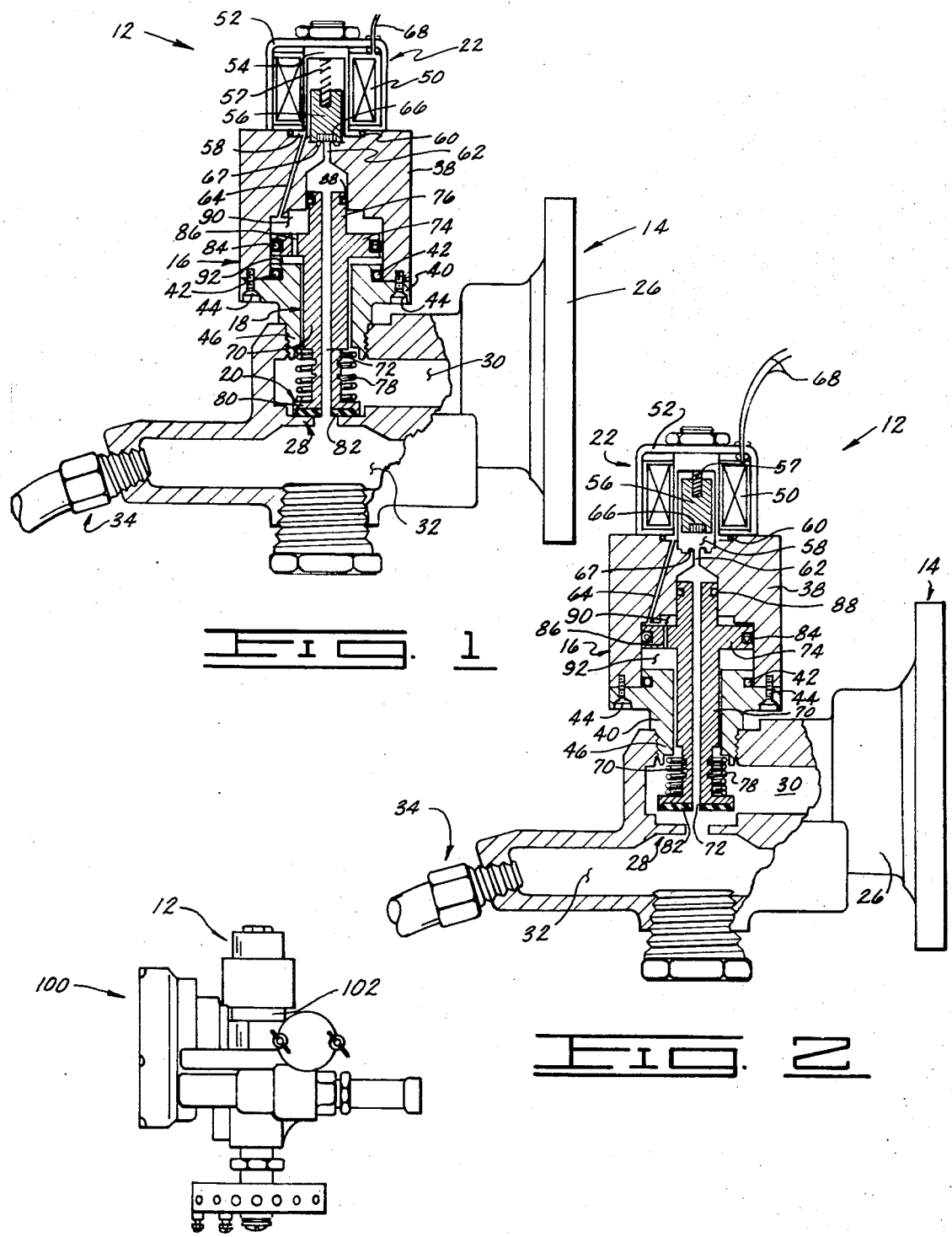
FIG. 1 is a cut-away side elevation view of the solenoid valve operator and the outlet portion of an anhydrous ammonia flow meter with the valve operator shown in the closed position.
FIG. 2 is a cut-away side elevation view of the solenoid actuated valve operator and outlet portion of an anhydrous ammonia flow meter with the valve operator shown in the open position.
FIG. 3 is a reduced side elevation view of the solenoid actuated valve operator mounted on a different type anhydrous ammonia flow meter than shown in FIGS. 1 and 2.

The following is a discussion and description of preferred specific embodiments of the new solenoid actuated valve operator of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, the solenoid actuated valve operator of this invention, generally indicated at 12, is shown mounted on the control valve portion of an anhydrous ammonia flow meter 14. The solenoid actuated valve operator includes a housing 16 having movable piston-plunger assembly 18 therein with the main valve closing member 20 on the end of the piston-plunger assembly 18 extended from the housing 16 positioned in the flow meter 14 and the solenoid assembly 22 on the opposite end of the housing 16.

Anhydrous ammonia flow meters are conventionally similar in construction with a metering apparatus in one portion and an outlet manifold in another portion. These portions of the anhydrous ammonia flow meters are separated by a main valve assembly which is used to stop and start flow through the flow meter. The metering apparatus controls the amount of gaseous fluid passing through the flow meter. The solenoid actuated valve operator of this invention is adapted for use with the flow meters to replace the conventional mechanical stop and start main valve operators used in conventional anhydrous ammonia flow meters. It should be noted that the solenoid actuated valve operator of this invention is shown and described with one particular design of anhydrous ammonia flow meter; however, is it to be understood that conventionally such flow meters are somewhat structurally similar, and this valve can be adapted for use with them. Also, it should be noted that the valve operator of this invention is not to be restricted only to use with anhydrous ammonia; it will function similarly with other normally gaseous fluids and will function in combination with devices other than flow meters or the like. A second design anhydrous ammonia flow meter is shown in FIG. 3 with the solenoid actuated valve mounted therewith. Necessarily modifications must be made to the housing of the solenoid actuated valve operator for it to be compatible with the different designs of anhydrous ammonia flow meters or other devices, but the operation and basic structural components remain the same as the one shown and described in detail herein.

Only the outlet portion of an anhydrous ammonia flow meter 14 is shown in FIGS. 1 and 2 of the drawings; it includes a portion of the flow meter housing 26 containing the control main seat 28 separating a pressure cavity 30, which is connected to the metering assembly portion of the flow meter, and the outlet manifold cavity 32. The outlet manifold cavity 32 as shown here is below the pressure cavity 30 and is an enlarged cavity with a plurality of threaded apertures therein which provide for attachment of several outlet conduits like that indicated at 34. The main valve seat 28 is a circular shaped portion in the flow meter housing 26 between the pressure cavity and the outlet manifold cavity 32 with a forming aperture therethrough to pass the anhydrous ammonia.

The housing 16 of the solenoid actuated valve operator 12 is preferably constructed in two separable members: an upper member 38 and a lower mounting member 40. The upper 38 and lower 40 members of the housing 16 are connected by a sealed joint with an O-ring 42 and are held together in place by a plurality of screws 44 passing through the lower housing member 40 and engaged with the upper member 38. The lower housing member 40 has a threaded exterior portion 46 adapted to be engaged with a threaded portion of the flow meter housing 26 to position the solenoid actuated valve operator 12 at the main valve. The inside of the lower housing member 40 is cylindrically shaped to receive the plunger portion of the movable piston-plunger assembly 18. The interior of the upper housing member 38 is cylindrically formed in two different sized adjoining portions, adapted to receive the piston portion of the piston-plunger assembly 18. The solenoid assembly 22 is mounted on the outer end of the upper housing member 38.

The solenoid assembly 22 includes an electromagnetic coil 50 enclosed in a coil housing 52 and surrounding a solenoid core enclosure 54. The solenoid core enclosure 54 has a cavity on the interior to contain the solenoid core 56 and a spring 57 which urges the solenoid core 56 away from the direction of the magnetic force. The upper end of the solenoid core enclosure 54 is extended and threaded to mount the coil housing 52, and the lower end thereof is threaded to attach the housing 16. As shown in the drawings the core enclosure 54 is attached to the top of the upper housing member 38 so as to form a cavity 58 with the interior of the core enclosure and the top portion of the upper housing 38. The solenoid coil 50 used in this invention can be preferably changed with other similar coils so as to provide for operation at any of the standard operating direct current voltages common to agricultural equipment where the device is used; these common operating voltages are 6, 12, or 24 volts. The upper portion of the upper housing 38 has an O-ring seal 60 to seal the cavity 58 between the upper housing 38 and the core enclosure 54. The cavity 58 is partially integrally formed with the upper housing 38 and has a main passageway 62 joining the bottom connecting it and the small end portion of the upper housing interior and a first passageway 64 connecting the cavity 58 and the larger portion of the upper housing interior. The solenoid core 56 has a resilient seal 66 on the lower end thereof adapted to engage a valve seat 67 at the upper end of the main passageway 62 so as to close the main passageway from the cavity 58. For electrically connecting the solenoid actuated valve 12 operator, the solenoid coil 50 has electrical wires 68 which pass through the coil housing 52.

The movable piston-plunger assembly 18 includes an elongated cylindrical plunger 70 with a passageway 72 therethrough along the axis thereof, an integral piston 74 of an enlarged diameter, and a reduced diameter outer end portion 76. The valve closing member 20 of the piston-plunger assembly 18 extends from the lower housing member 40 and has a helical spring 78 therearound compressed between the lower end of the housing and the enlarged end 80 of the plunger 70. The spring 78 provides a resilient force to extend the movable piston-plunger assembly 18. The enlarged end 80 of the plunger 70 has an extended lip adapted to hold a resilient seal member 82; this forms the valve closing member 20 which is adapted to seal the cavities 30 and 32 of the flow meter at the control valve seat 28. The resilient seal 82 has an aperture through the center thereof to permit communication to the plunger passageway 72. That portion of the plunger 70 passing through the lower housing member 40 is sized to a loose fit and does not have a seal therearound; so in operation of the solenoid actuated valve operator 12, gaseous fluid can pass between the housing 40 and the plunger 70. The enlarged piston 74 is fitted with an O- ring 84 around the periphery thereof; it also has a small passageway 86 therethrough connecting the top and bottom. The upper end portion 76 of the movable piston-plunger assembly 18 is fitted with an O-ring seal 88 so as to seal it with the reduced portion of the upper housing 38 in which it slides. The piston 74 separates the interior of the upper housing 38 into an upper piston cavity 90 and lower piston cavity 92 which have limited communication via the piston passageway 86.

The solenoid actuated valve operator 12 is shown in FIG. 3 mounted on a different type of anhydrous ammonia flow meter, indicated at 10, than that shown in FIGS. 1 and 2. The valve operator in FIG. 3 is essentially the same as the one described in detail with the exception of the lower mounting portion of the housing. The lower housing member 40 of the described valve operator is adapted to be threadedly attached to the flow meter housing; whereas the lower housing portion 102 for the solenoid actuated valve operator shown in FIG. 3 is adapted to be bolted to the flow meter housing by bolts, not visible in the drawing.

When attached to an anhydrous ammonia flow meter and ready for use, the solenoid actuated valve operator 12 is in the position shown in FIG. 1. The wires 68 from the solenoid assembly 22 are connected to a power source and switch therefor with the switch in open position so no current is flowing in the electrical circuit. The pressure cavity 30 is at the normal outlet static pressure of the outlet side of the anhydrous ammonia flow meter; this can vary between 30 and 90 pounds per square inch. Additionally, parts of the solenoid actuated valve operator 12 which are in open communication with the pressure cavity 30 are also at the outlet static pressure. The portions of the solenoid actuated valve 12 which are at the normal outlet static pressure are the communicable space between the plunger 70 and the lower housing member 40, the lower piston cavity 92, the piston passageway 86, the upper piston cavity 70, the first passageway 64, and the solenoid core cavity 58. The resilient seal 66 of the solenoid core 56 seals the normal static outlet pressure portion of the valve from the remaining portion which is at atmospheric pressure. When the solenoid actuated valve operator 12 is in the closed position, the outlet conduits 34 vent the outlet manifold cavity 32 to the atmosphere so it is at substantially atmospheric pressure. Portions of the solenoid actuated valve operator 12 which are at substantially atmospheric pressure when the main valve is closed are the outlet manifold cavity 32, the plunger passageway 72, the cavity above the reduced end portion 76 of the piston-plunger assembly 18, and the main passageway 62. The resilient plunger end seal 82 is urged into firm contact with the main valve seat 28 in the flow meter by the spring 78 and prevents communication through the main valve seat area between the pressure cavity 30 and the outlet manifold cavity 32.

In order to open the solenoid actuated valve operator 12 when it is in the above described closed position, the switch must first be thrown in the electrical circuit allowing current to pass; this moves the solenoid core 56 from the position shown in FIG. 1 to the position shown in FIG. 2. The solenoid core 56 in the position shown in FIG. 2 is its normally open position; it allows communication between the solenoid core cavity 58 and the main passageway 62. Once communication is established through the solenoid core cavity 58 and the main passageway 62, anhydrous ammonia begins to flow through the communicable space between the lower housing member 40 and the plunger 70, through the piston passageway 86, through the first passageway 64, through the solenoid core cavity 58, through the main passageway 62, through the plunger passageway 72 and into the outlet manifold cavity 32. As this flow increases, a pressure is created in the cavity 92 below the piston 74 due to the expansion or flashing of anhydrous ammonia upon exposure to the atmospheric pressure; this pressure overcomes the force of the spring 78, and the piston-plunger assembly 70 moves upward removing the resilient plunger seal 82 from contact with the main valve seat 28 thus allowing the anhydrous ammonia to pass to the outlet manifold cavity 32. The valve operator 12 is then in the open position as shown in FIG. 2. In the open position there is sufficient continuing flow of anhydrous ammonia through the passageways in the valve and sufficient pressure in the cavity 92 to hold the piston-plunger assembly 18 in the open position against the force of the spring 78.

In order to close the solenoid actuated valve operator 12 once it is in the open position, the electrical power supplied to the solenoid assembly 22 must be terminated so the solenoid core 56 can stop flow of the anhydrous ammonia through the passageways of the valve. Once the solenoid core 56 is released from control of the solenoid coil 50, it is urged by the spring 57 so the resilient seal portion 66 contacts the valve seat 67 on the main passageway 62 stopping flow of the anhydrous ammonia through the smaller passageways of the valve. When this flow of anhydrous ammonia is stopped, the pressure in the cavities 90 and 92 above and below the piston 74 becomes substantially equal; thus no more force is on the bottom of the piston 74, and force of the spring 78 moves the piston-plunger assembly 18 downward so the seal 82 contacts the main valve seat 28 shutting off the main flow of anhydrous ammonia from the pressure cavity 30 to the outlet manifold cavity 32. When this closing process is complete, the solenoid actuated valve operator 12 is again in the position shown in FIG. 1. The prime feature of the closing operation of this solenoid actuated valve operator is that when the electrical power is terminated the valve will positively close and stop flow of the anhydrous ammonia from the flow meter.

In the manufacture of the solenoid actuated valve operator 12 of this invention, it is obvious that the components thereof can be constructed from materials which are corrosively resistive to anhydrous ammonia and which will allow it to function properly at the reduced temperature which is encountered with the flashing anhydrous ammonia as it leaves the flow meter.

In the use of the solenoid actuated valve operator 12 of this invention, it is seen that the same provides a valve structure adapted to use with conventional types of anhydrous ammonia flow meters. The solenoid actuated valve operator structure 12 is adapted to be electrically operated and provides positive means of opening and closing the main valve in the anhydrous ammonia flow meter.

As will be apparent from the foregoing description of the solenoid actuated valve operator of this invention relatively simple means have been provided to control the flow of anhydrous ammonia from an anhydrous ammonia flow meter. The solenoid actuated valve operator is easily attached to a conventional anhydrous ammonia flow meter and provides positive means of starting and stopping the flow of anhydrous ammonia through the flow meter.

While the invention has been described in conjunction with preferred specific embodiments thereof, it will be understood that this description is intended to illustrate and not to limit the scope of the invention, which is defined by the following claims.

We claim:

1. A solenoid actuated valve operator means for controlling the flow of a normally gaseous fluid from a liquid supply of same, comprising:
   a. a valve operator housing,
   b. a solenoid means mounted with said housing and having a core member with means on an end portion thereof constructed and adapted to close a passageway,
   c. movable means having means therewith to receive fluid pressure thereon mounted within said housing, said movable means having a portion extending from said housing, a passageway therethrough communicating with said solenoid means, and valve closing means mounted on the outer end portion of said extended portion, said core member operable to close and/or open said passageway,
   d. another passageway within said housing communicating between a point outside of said housing and said solenoid means, and
   e. resilient means urging said movable means into extended position, said solenoid actuated valve operator means adapted to be mounted on a conduit having a valve seat therein, and when so mounted said valve closing means contactable with said valve seat, and in operation with said core member closing said passageway, said resilient means extending said valve closing means to closed position with the valve seat, and with said core member not closing said passageway, and force exerted on said fluid pressure receiving means on said movable means by pressure from the fluid in liquid form exerted thereon overcoming said resilient means to retract said movable means and move said valve closing means to open position.

2. The valve operator means of claim 1 wherein:
   a. said movable means is a slidably mounted plunger, and said means therewith to receive fluid pressure is a piston, and
   b. said resilient means is a spring mounted between said housing and said valve closing means, said spring acting in compression.

3. The valve operator means of claim 2 wherein:
   a. said passageway through said plunger is a gaseous fluid passageway, and
   b. said another passageway is a liquid fluid passageway in communication with said piston.

4. A solenoid actuated valve operator means for controlling the flow of a normally gaseous fluid from a liquid supply of same, comprising:
   a. a valve operator housing,
   b. a solenoid means having an inner chamber closed to the atmosphere, and an axially movable core member mounted in said chamber, said solenoid means mounted with said housing,
   c. a chamber within said housing having an intermediate portion larger than the outer portions, a first passageway through said housing communicating between the outer end portion of said chamber within said housing and said solenoid chamber, the outer end portion of said passageway having a valve seat receiving in operation said core member, a second passageway through said housing communicating between the outer portion of said intermediate portion of said chamber within said housing and said solenoid chamber,
   d. a piston-plunger means having a central plunger portion mounted in said outer portions of said chamber within said housing, the inner plunger portion extending from said housing and forming with said housing an annular passageway communicating between the outside of said housing and the inner portion of said intermediate portion of said chamber within said housing, sealing means between an outer end portion of said plunger portion and said housing, a piston mounted in said intermediate portion of said chamber within said housing, a main passageway through said plunger portion communicating between said first passageway through said housing and outside said plunger portion, and a passageway through said piston,
   e. a valve closing means mounted on the outer end portion of said extended inner plunger portion, and
   f. resilient means urging said piston-plunger means into extended position, said solenoid actuated valve operator means adapted to be mounted on a conduit having a valve seat therein, and when so mounted said valve closing means contactable with said valve seat, and in operation with said core member closing said first passageway in said housing, said resilient means extending said valve closing means to closed position with the valve seat, and with said solenoid actuated to retract said core member and open said first passageway in said housing, the force exerted on said piston by the pressure from the fluid in liquid form exerted thereon overcoming the force of said resilient means to retract said plunger portion and move said valve closing means to an open position relative the valve seat.

5. The valve operator means of claim 4 wherein:
   a. said first passageway through said housing and said main passageway through said plunger portion is a gaseous fluid passageway,
   b. said second passageway through said housing, said annular passageway and said passageway through said piston is a liquid fluid passageway, and
   c. said resilient means is a helical spring mounted around said extended inner plunger portion between said housing and said valve closing means, said spring acting in compression.

6. The solenoid actuated valve operator as described in claim 5, wherein:
   a. said lower housing portion is threaded on the outer end portion thereof adapted to threadedly attach an anhydrous ammonia flow meter.

7. The solenoid actuated valve operator as described in claim 6, wherein:
 a. said lower housing portion has a flanged portion on the lower end thereof adapted to attach said solenoid valve to said anhydrous ammonia flow meter.

* * * * *